United States Patent [19]

Sheaffer et al.

[11] Patent Number: 5,710,902

[45] Date of Patent: Jan. 20, 1998

[54] INSTRUCTION DEPENDENCY CHAIN INDENTIFIER

[75] Inventors: Gad S. Sheaffer, Haifa; Robert Valentine, Qirvat Tivon, both of Israel

[73] Assignee: Intel Corporation, Santa Clara, Calif.

[21] Appl. No.: 524,065

[22] Filed: Sep. 6, 1995

[51] Int. Cl.$^6$ .................................................. G06F 9/38
[52] U.S. Cl. ................................... 395/392; 395/393
[58] Field of Search .................................. 395/392, 393, 395/800

[56] References Cited

U.S. PATENT DOCUMENTS

| | | | |
|---|---|---|---|
| 4,969,117 | 11/1990 | Miranker | 364/730 |
| 5,201,057 | 4/1993 | Uht | 395/800 |
| 5,539,911 | 7/1996 | Nguyen et al. | 395/800 |

OTHER PUBLICATIONS

"Superscalar Microprocessor Design," by Mike Johnson, Prentice-Hall (1991).

Primary Examiner—William M. Treat
Attorney, Agent, or Firm—Blakely, Sokoloff, Taylor & Zafman

[57] ABSTRACT

A method and apparatus for identifying a sequence of instructions that generate data used by an instruction in a programmed flow of instructions includes a bit array of i lines, where i is an integer, each line representing an instruction in an ordered sequence of instructions. A line in the bit array is made up of a string of bits in which a bit position is set corresponding to a preceding instruction that the instruction is dependent upon. Logic coupled to the bit array generates the string of bits for the next instruction by setting bit positions which correspond to directly dependent instructions and additional bit positions corresponding to the predecessor instructions.

9 Claims, 3 Drawing Sheets

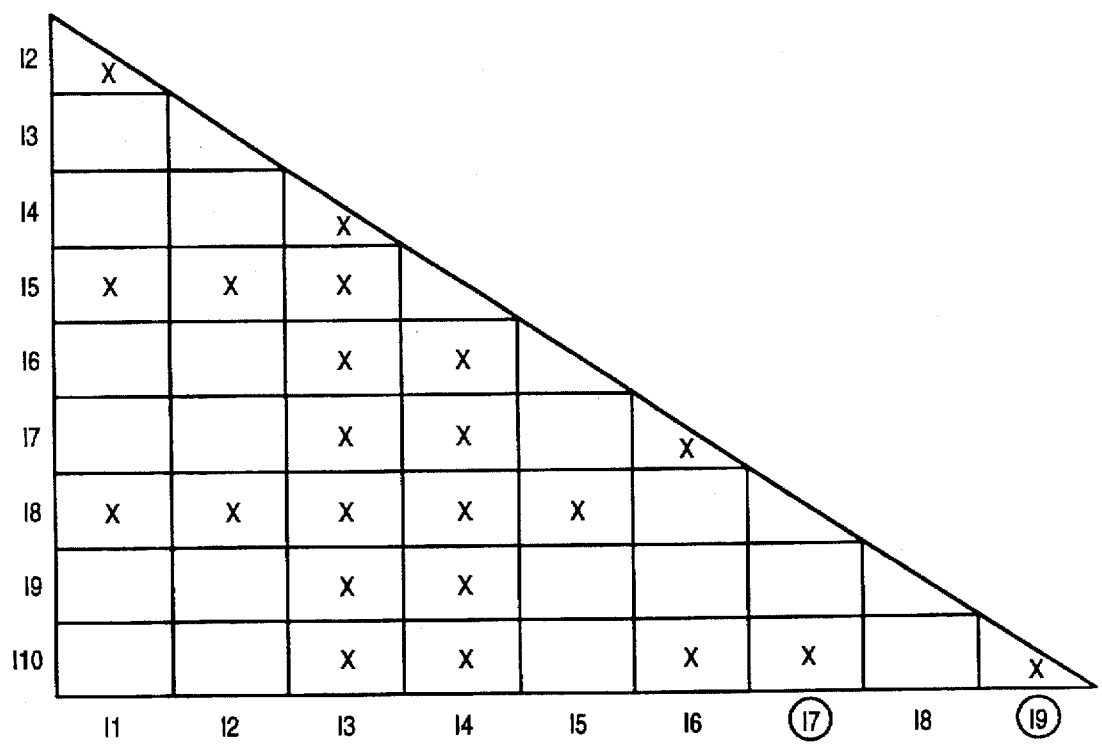
FIG_1
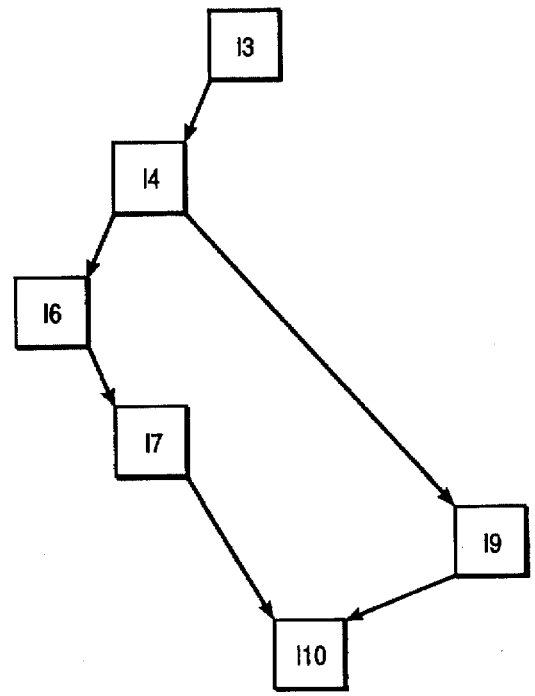
FIG_2

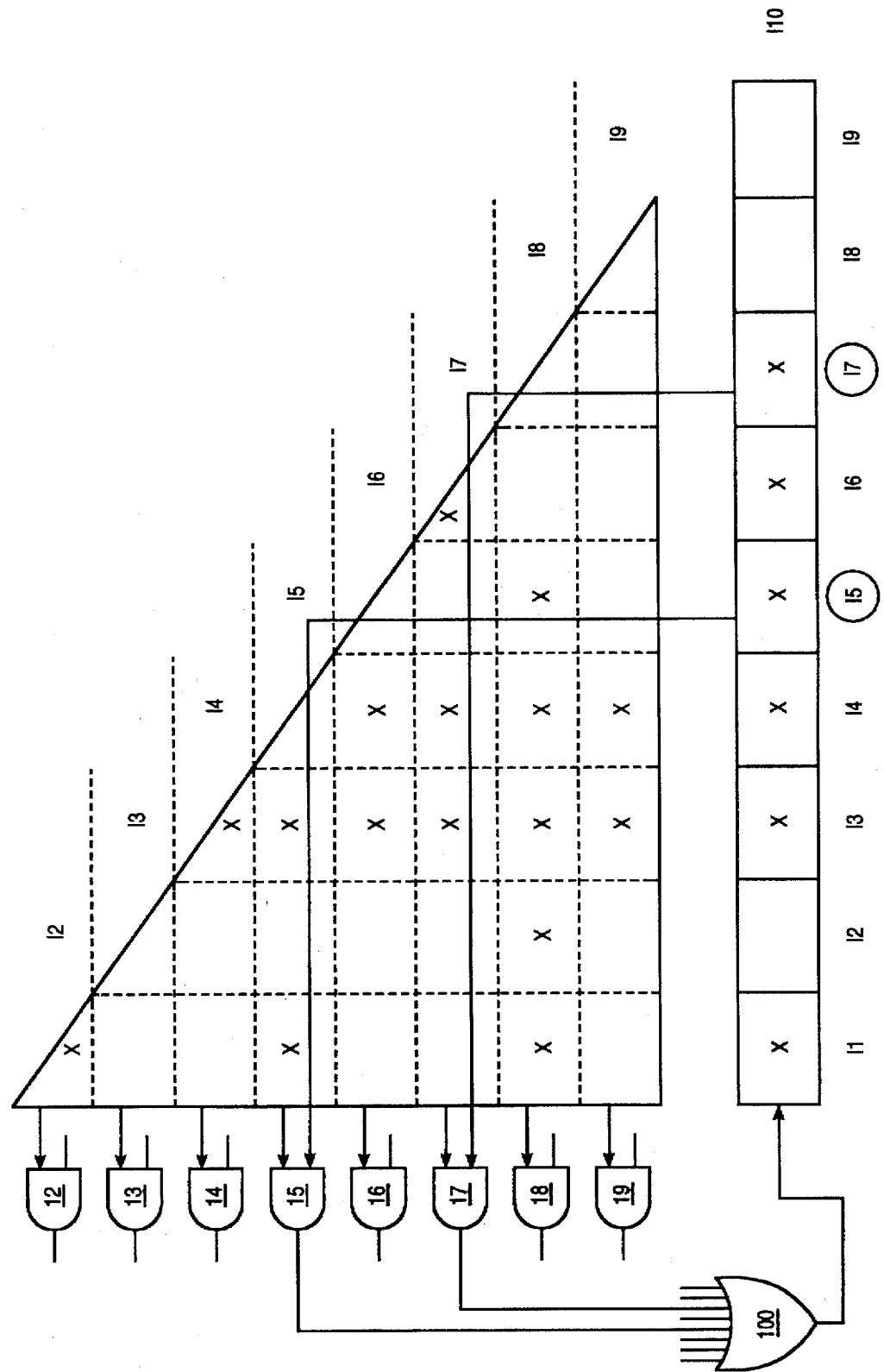
FIG_3

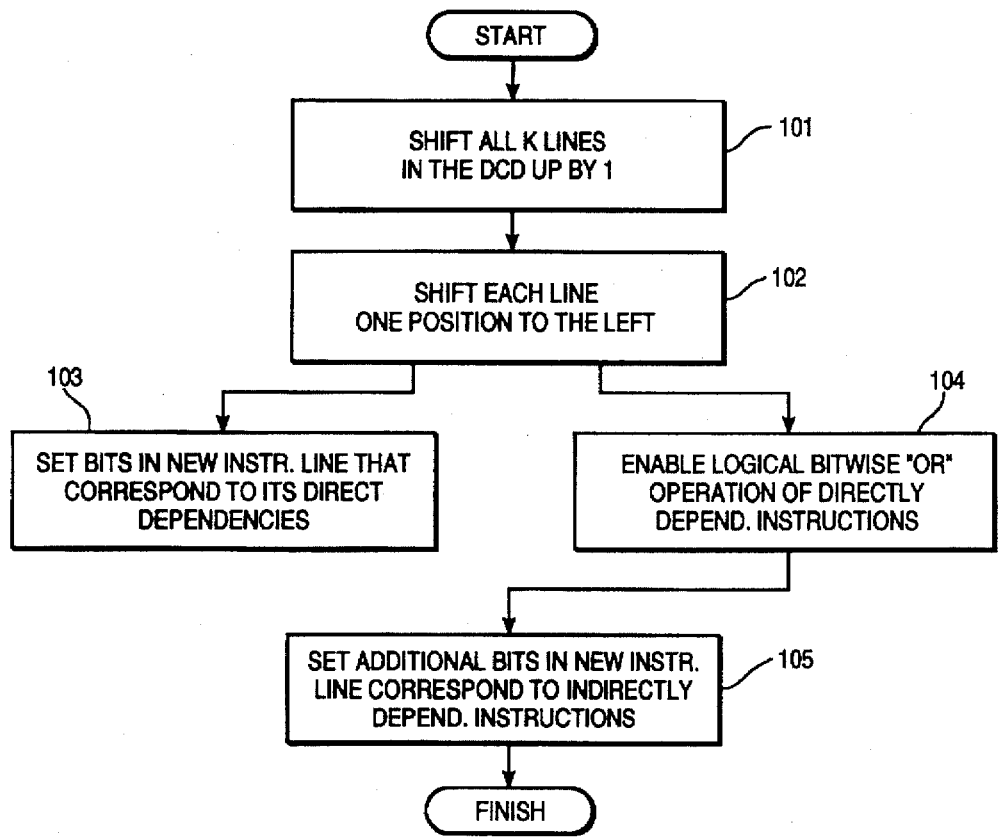
FIG_4
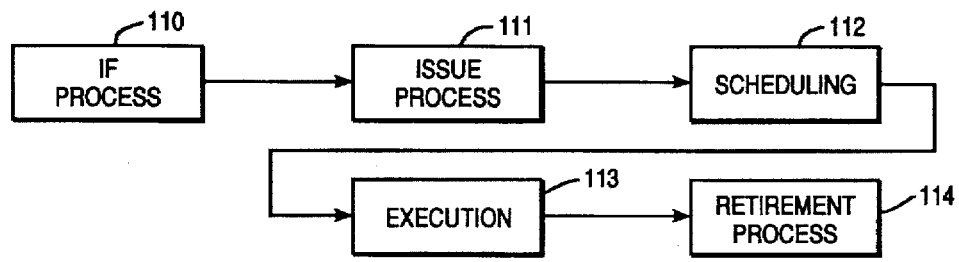
FIG_5
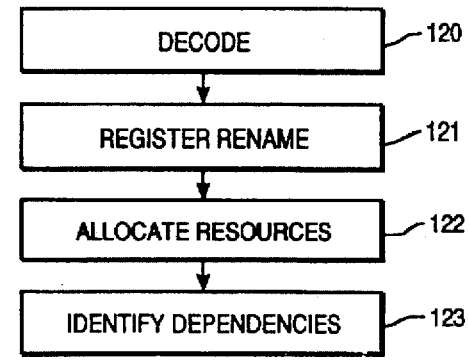
FIG_6

INSTRUCTION DEPENDENCY CHAIN INDENTIFIER

FIELD OF THE INVENTION

The present invention relates generally to the fields of microprocessors and data processing systems. More specifically, the invention relates to techniques and circuits for improving program execution in an advanced computer system.

BACKGROUND OF THE INVENTION

Improving processor performance is the chief concern of most researchers working the field of microprocessors and computer applications. Since the primary function of many general-purpose computers is to execute a program consisting of a sequence of instructions, a computer characterized as operating with improved performance completes a given program faster than a previous generation machine.

Application programs generally comprise a group of instructions that are fetched by the processor and then executed according to some sequence. Historically, computer instructions have been structured to execute a program one instruction at a time in a linearly-ordered sequence. Execution of a single instruction involves general processes of fetching the instruction, decoding the instruction, assembling its operands and performing the arithmetic, logical, or control operations specified by the instruction, and writing the results of the instruction to a storage location.

Recent innovations in the field of microprocessor architecture have made possible the execution of multiple instructions at the same time. The term "superscalar processor" denotes a processor that reduces the average number of cycles per instruction by allowing concurrent execution of instructions. Superscalar computer implementations are discussed in the book entitled "Superscalar Microprocessor Design," by Mike Johnson, Prentice-Hall, (1991). Because superscalar processors make it possible to execute more than one instruction per cycle, to take advantage of this capability careful attention must be paid to the interrelationships between various instructions.

Within any computer program, instructions are not independent of one another, but are interrelated. For example, within an ordered sequence of instructions a given instruction may require or depend upon data produced by a predecessor instruction. In other situations, different instructions may create conflicts for hardware resources needed for execution. Thus superscalar processors have fundamental limitations resulting from the inherent characteristics of processing architecture and the computer programs themselves.

One technique for improving the performance of superscalar processors involves the completion of instructions out-of-order with respect to the in-order sequence of instructions originally input to the computer. In a computer processor capable of executing and completing instructions out-of-order, certain instructions which occur later with respect to the in-order computer program sequence may finish executing before earlier instructions in the sequence have completed. In these highly-complex machines, out-of-order completion depends upon resolving data dependencies and conflicts for functional units up to the total number of pipeline stages.

Although out-of-order completion machines are theoretically capable of yielding higher performance than in-order processors, they typically require additional, more complex hardware. At least a portion of the additional hardware logic should be capable of checking data dependencies between decoded instructions and all other instructions in the pipeline. The logic must also insure that results are written in the correct order intended by the original in-order program sequence. Attempts at implementing superscalar processors with out-of-order completion have resulted in a number of techniques which utilize specialized circuitry and hardware; particularly for examining data affected by each stage of the pipeline to determine if data conflicts exist. By way of example, a method for throttling the processing of instructions in individual pipelines where data conflicts exist is described in U.S. Pat. No. 4,969,117.

As will be seen, the present invention provides a scheme for identifying instructions that produce results needed for the execution for the specific instructions which follows. These earlier instructions are said to be within the execution path of the later instruction. Alternatively, the earlier instructions upon which the later instruction depend may be said to be part of the "dependency chain" of that instruction. The apparatus and method of the present invention therefore provides the ability to identify the execution path within a window of instructions at run time. The instruction window is defined as being some finite number of instructions preceding the instruction whose execution path it is desired to determine.

SUMMARY OF THIS INVENTION

The present invention is a method and apparatus for identifying a sequence of instructions that generate data used by an instruction in a programmed flow of instructions. The invention provides a window of information identifying source dependencies for all instructions within that window, i.e., for that particular sequence.

The need for dependency chain identification arises in a number of situations. One example is instruction scheduling which necessarily involves dependency considerations. Identifying instructions on the dependency chain of certain critical instructions is advantageous since it enables granting priority to the dependent instructions during scheduling. Furthermore, in situations where one dependency chain is significantly longer than others, granting a high priority to the dependent instruction(s) during scheduling and resource allocation offers obvious benefits.

In one embodiment, the invention comprises an apparatus for identifying instruction dependency chains. The apparatus comprises a bit array of i lines, where i is an integer, each line representing an instruction in an ordered sequence of instructions. A line within the bit array is made up of a string of bits in which a bit position is set corresponding to a preceding instruction that the instruction is dependent upon. In a particular implementation, the bit array is a triangularly-shaped storage structure providing a window of instructions over time, wherein dependency information falls off to the left as time moves out of the window. Each new instruction entering the window shifts the lines of the bit array up by one line, and the bit positions to the left by one bit position.

The apparatus further comprises logic means coupled to the bit array for generating the string of bits representing the next instruction to be stored in the ith line of the bit array. For example, in a particular implementation, the new instruction occupies the bottom line vacated following the shifting operation. That is, the logic means first performs the shifting operation to shift the string of bits in each line up by one line, and to the left by one bit position. This vacates the bottom line in the array. The logic means then produces the string of bits for the next instruction by setting bit positions which correspond to directly dependent instructions. The directly dependent instructions generate the source operands required for the immediate execution of the instruction.

The logic means also sets additional bit positions that correspond to the indirectly dependent instructions. The indirectly dependent instructions are the predecessor instructions which are required for completion of the dependency chain.

In a specific embodiment, the logic means comprises a means for performing a logical bitwise OR operation between the string of bits of the lines corresponding to the directly depending instructions. The output of the logical bitwise OR operation is used to set additional corresponding bit positions in the ith line.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

FIG. 1 illustrates a instruction window storage structure according to one embodiment of the present invention.

FIG. 2 is an example illustrating the dependency chain detector for one embodiment of the present invention.

FIG. 3 illustrates one implementation which may be used to implement the DCD of the present invention.

FIG. 4 shows the operations performed in one implementation of the method of the present invention.

FIG. 5 illustrates the basic operation of a computer in accordance with the present invention.

FIG. 6 illustrates various sub-processes of one aspect of the present invention.

DETAILED DESCRIPTION

The present invention is an instruction dependency chain identifier that provides backward scanning of the instruction stream in the form of a storage structure having a minimum size and complexity.

FIG. 1 illustrates a storage structure, triangular in shape, that represents the lower half of a bit array or matrix. The width and height of the triangular storage structure shown in FIG. 1 corresponds to the length or size of the instruction window in one embodiment of the present invention. The storage structure and the associated logic represent the dependency chain detector (DCD) apparatus of the present invention.

Each horizontal line in the DCD of FIG. 1 corresponds to a single instruction and contains a string of bits in which a bit is set for each of the preceding instructions on which that instruction depends. Thus, for the example illustrated by FIG. 1, the instruction window is nine instructions long, consisting of I2 through I10. Each of the instructions I2–I10 is represented by a horizontal line in the DCD. Dependency chain information is represented by bits that are set in positions corresponding to preceding instructions of an in-order sequence of instructions. In the example of FIG. 1 it can be seen that instruction I0 depends, either directly or indirectly, on instructions I3, I4, I6, I7 and I9. This is shown in FIG. 1 by a "X", denoting a set bit, at the corresponding bit positions of those preceding instructions. This means that instructions I3, I4, I6, I7 and I9 must complete execution before instruction I10 can execute.

To put it another way, in order to execute, instruction I10 needs to have certain source operands available. These source operands are produced as a result of operations performed by the sequence of preceding instructions, e.g., I3, I4, I6, I7 and I9. Because instructions I7 and I9 provide the source operands required for the execution of instruction I10, instruction I10 is referred to as being directly or immediately dependent on instructions I7 and I9. This is denoted in FIG. 1 by the encircled "I7" and "I9" notations under the bottom line of the storage array. The new instruction, in this case instruction I10, is assumed to have been provided a bit vector corresponding to its immediate instruction dependencies. This can normally be done as soon as the source operands of the instruction are known in the pipestage prior to the DCD update.

Conceptually, the immediately dependent instructions can be thought of as being the "parent" instructions to the current instruction in the instruction window. Following this analogy, the indirectly dependent instructions then consist of all other instructions within the family chain, i.e., the "grandparent", "great grandparent", etc., instructions. In FIG. 1, the indirectly dependent instructions of instruction I10 comprise instructions I3, I4 and I6.

With continuing reference to FIG. 1, the indirectly dependent instructions can be determined by looking at the horizontal lines of the matrix corresponding to the directly dependent instructions. In this example, the directly dependent instructions are I7 and I9. Looking at the horizontal line corresponding to instruction I9, it can be seen that this instruction depends upon instructions I3 and I4. Similarly, the line corresponding to instruction I7 contains set bits corresponding to instructions I3, I4 and I6. Hence, the indirect dependencies for the current instruction I10 contain set bits at bit positions corresponding to instructions I3, I4 and I6.

FIG. 2 provides a conceptual illustration of the dependency chain information produced by the DCD of the present invention for a current instruction I10. FIG. 2 shows instruction I10 as being immediately dependent upon parent instructions I7 and I9. Instruction I7, in turn, is shown to be dependent upon previous instructions I6, I4 and I3, in that order. Likewise, instruction I9 depends upon the results produced by instruction I4, which itself depends upon the results produced by instruction I3.

So it is evident that the vector consisting of the string of bits representing I10 contains all of the necessary information within the dependency chain. If we assume that instruction I10 is a critical instruction—meaning that improved computer performance relies upon its fast execution—this means that the previous instructions I3, I4, I6, I7 and I9 should be given priority over the other instructions in the instruction window; namely, I1, I2, I5 and I8.

Thus, one of skill in the art of computer processing will appreciate that the present invention is useful in either reduced instruction set computers (RISC) or complex instruction set computers (CISC) that operate with out-of-order execution or completion. An important advantage of the DCD of the present invention is that it provides the ability to speed up critical instruction path execution. By identifying critical chains of dependency in a program, machine resources can be allocated in the critical dependency chain so those instructions to as to insure optimal scheduling—regardless of whether the instruction set being RISC or CISC.

Generating or updating the DCD involves several steps. FIG. 4 shows the operations performed in one implementation of the method of the present invention. First, all of the lines in the DCD are shifted up by one line. This is represented in FIG. 4 by block 101. Shifting up the lines by one line position vacates the bottom line for the next instruction. Referring back to the example of FIG. 1, the ninth instruction in the previous window is the eighth instruction in the current instruction window, and so forth.

As the lines are shifted up, the lines are also shifted to left by one bit position. This operation is shown occurring in block 102. Shifting the bit positions to the left reflects their changed locations in the instruction window as time marches on. As explained previously, the DCD is structured so that as time progresses, the bit positions move out of the window to the left. This means the instruction that occupied the first row of the previous window is now out of the DCD window, as all of its dependencies are on instructions no longer within the current instruction window.

It should be understood that shifting operations can be overlapped with either the previous stage operation of checking the immediate instruction dependencies (as will be explained below) or with the next one; i.e., updating the contents of the lines. Furthermore, shifting of the lines and bit positions may occur simultaneously or sequentially, in either order. In other words, the order that the line and bit shifts occur is unimportant to the basic concept of the invention.

The procedure for generating a new line at the bottom of the window requires two additional operations; both of which can be performed in parallel. First, as shown in block 103, the bits corresponding to preceding instructions that the new instruction directly depends upon are set. Meanwhile, the bit masks from these same two parent instructions are selected and combined. This takes place via a logical bitwise OR operation. The results of the logical bitwise OR operation are then written to the current line.

These "OR" bits add to the mask all of the instructions upon which the current instruction is indirectly dependent. As explained earlier, the indirect instructions in the dependency chain comprise the older ancestor instructions of the dependency chain. This is shown occurring in FIG. 4 by steps 104 and 105.

FIG. 3 illustrates one possible hardware implementation which may be used to implement the DCD of the present invention. In the example of FIG. 3, assume that instructions I5 and I7 are the directly dependent instructions for the current instruction I10. This is denoted in FIG. 3 by the encircling of "I5" and "I7" under the set bit positions in the bottom line in the DCD matrix. Setting of these bit positions enables the corresponding AND gates coupled to the associated lines in the matrix. In the example of FIG. 3, AND gate 15 is enabled corresponding to the bit positions for instruction I5. Also, the AND gate 17 is enabled corresponding to the string of bits associated with instruction I7.

The logical bitwise OR operation of these two lines of the DCD matrix provides the bits which correspond to the indirectly dependent instructions. This is shown in FIG. 3 by OR gate 100 which have inputs coupled to the outputs of AND gates 15 and 17. Gate 100 has an output that is coupled back to the bottom line of the storage matrix—in this case, the bottom line corresponds to the current instruction I10. The net result of the bitwise OR operation for the example of FIG. 3 is the setting of the bit positions which correspond to the instructions I1, I3, I4 and I6. Hence, the new line for current instruction I10 includes set bits at positions I1, I3, I4, I5, I6 and I7. In the example of FIG. 3, the two source operands are produced by the directly dependent instructions I5 and I7. The indirect dependencies are produced by combining the bit vectors in a bitwise OR operation from the lines in the instruction window corresponding to instructions I5 and I7.

As is evident from the above example, the full dependency chain of a current or new instruction is available immediately. The operations required beyond the regular dependency analysis are minimal, being comprised of shift operations, line selection, a bitwise OR and a line update. Some of these operations, of course, can be overlapped or combined.

Although the concept of the present invention is shown by way of example for single instruction updates, it is appreciated that it can also be extended to multiple instructions per cycle (or simultaneously). These could be marked given multiple read ports on the DCD bit vectors. For multiple instruction update, there would also be a mechanism for dealing with dependencies among the instructions being added together in the window. By way of example, this may be implemented through ordinary prioritization circuitry which is normally a feature of a typical superscalar pipeline. Such circuitry could either reside in the DCD or in the stage prior to it, i.e., the stage that determines the instruction's immediate predecessors.

Practitioners of skill in the art will appreciate that there are a variety of different ways to utilize the vector information contained within the DCD of the present invention. The case in which a critical instruction of a program is already known has been discussed in the examples provided above. The present invention, however, is also useful for assembling dependency chain information in situations where critical instructions are not known beforehand. For instance, the present invention is ideally suited for determining which instructions are crucial to the fast execution of a program. Critical instructions can be identified by logging the number of bits set in the instruction window—either in a vertical column of the window or as a number of bit entries in the vector representing the current instruction. As explained previously, identification of critical instructions and their dependencies is vital to the scheduling process.

Another important advantage of the invention is that if a critical instruction is known in advance, the associated bit vector identifying the dependency chain may be copied to wherever the instruction currently resides. In a typical superscalar processor this dependency information may be copied to the reservation station. Copying the dependency chain to the reservation station provides important priority information useful during the scheduling and execution processes. It should be understood that this information can not only be used for current execution, but also stored for later execution. One possibility is to store the dependency chain information for a particular instruction along with that instruction in the computer's instruction cache.

FIG. 5 illustrates the basic operation of a computer system in accordance with the invention as a sequence of processes. The system of FIG. 5 may comprise either a CISC or a RISC type of processor.

The first process is shown by block 110 which comprises the instruction fetch (IF) process. The IF process fetches instructions from memory and places them into a buffer or queue. From there, other processes are involved in the execution of the instruction, wherein the instructions may execute and/or complete out-of-order.

Block 111 follows the instruction fetch process and represents the issue process. The issue process subsumes the processes of instruction decode, register renaming, and generally everything up until the time the data is placed into the computer system's reorder buffer. In accordance with the present invention, the issue process may broadly be considered to assume the identification of instruction dependencies previously described.

Following the issue process, the next process is reservation station scheduling, as shown by block 112. The reservation station is a buffer that holds instructions or operations that have yet to execute. The scheduling process involves scanning the instructions to determine when a particular operation is ready to be performed. Generally, an instruction or operation is ready when source data and machine resources are available. In accordance with the invention, scheduling also takes into account instruction dependencies, such that critical instructions have their dependent operations given a high priority.

Execution occurs in FIG. 5 at block 113. Execution results are normally held in a non-architectural, temporary state. Retirement is the active process of removing a completed operation or instruction from the reorder buffer and committing its state to whatever permanent architectural state is designated by the original in-order instruction sequence. Thus, the retirement mechanism represented by block 114 restores the original program flow to re-impose order, transferring the speculative state of the machine to an architectural state.

FIG. 6 illustrates the sub-processes of the issue process 111 shown previously in FIG. 5. In FIG. 6, the issue process is shown decomposed broadly into a decode process 120 followed by register renaming (block 121). Register renaming refers to the process by which registers are allocated to hold temporary data values. Register renaming, in certain implementations, may utilize a state table maintained by hardware at run time. A separate allocation process (shown by block 122) decides which of many physical registers results are to be steered to. Note that register renaming and resource allocation take place after an instruction has been fetched and decoded. Once resources have been allocated, the appropriate operands are fetched and made ready by placing them in the reservation station.

In accordance with the invention, however, the dependency chain detector may be utilized to identify chains of instruction dependencies. This is represented in FIG. 6 by block 123. In other words, the dependency chain detector may be utilized to tag in-order instructions with priority information. When the instruction gets to the reservation station prior to scheduling, this priority information may be utilized by the scheduler in determining which instructions are executed first. By generating dependency chain information for all instructions in a program, a constant backwards state is created to ensure optimum scheduling.

Note that with respect to FIG. 6, the step of creating an instruction's full dependency chain may occur after register renaming, but prior to the allocation of resources.

Practitioners will appreciate that the complexity of the method and apparatus described above is minimal. Indeed, it is minimal enough to enable its usage even in high frequency, heavily-pipelined processors. Additionally, storage requirements are modest and the structure required is regular, which lends itself to easy semiconductor mask layout.

We claim:

1. Apparatus for identifying instruction dependencies comprising:

a bit array of i lines, where i is an integer, each line representing an instruction in a sequence of instructions and comprising a string of bits in which a bit position is set corresponding to a preceding instruction on which the instruction is dependent, and wherein the bit array is triangular with a first line having a single bit position in the ith line having l bit positions;

logic means coupled to the bit array for generating the string of bits for a next instruction stored in the ith line of the bit array, the logic means shifting the string of bits in each line of the bit array by one line and by one bit position, and generating the string of bits for the next instruction by setting bit positions which correspond to directly dependent instructions as well as additional bit positions corresponding to indirectly dependent instructions, the logic means including means for performing a logical bitwise OR operation between the string of bits of the lines corresponding to the directly dependent instructions, a result of the logical bitwise OR operation being written to corresponding bit positions of the ith line.

2. The apparatus of claim 1 wherein the means for performing the logical bitwise OR operation comprises an AND/OR logic structure.

3. In an out-of-order computing system, a method of operation comprising the steps of:

(a) decoding an in-order sequence of instructions;

(b) checking data dependencies for each instruction of the in-order sequence;

(c) generating an instruction dependency matrix which identifies both direct and indirect dependencies for a set of instructions of the in-order sequence, the set of instructions including l instructions and where the matrix includes a triangular storage structure having l lines, an ith line corresponding to an ith instruction of the in-order sequence, the ith line having l bit positions in which a jth bit position is set corresponding to the jth instruction on which the ith instruction is dependent, where l and j are integers, for an ith instruction of the in-order sequence, the generating step further including the steps of:

shifting the bit positions in each line of the matrix up by one line, and to the left by one bit position, thereby vacating the ith line;

setting, in the ith line, bit positions corresponding to instructions on which the ith instruction is directly dependent, thereby producing a first string of bits for the ith line;

performing a logical bitwise OR operation on the lines that correspond to the directly dependent instructions to produce a second string of bits;

performing a logical bitwise OR operation on the first and second string of bits, the results for each bit position being stored in the corresponding bit position of the ith line;

(d) scheduling execution of each instruction of the sequence in an optimum order based, at least in part, on the instruction dependency matrix wherein the optimum order differs from the in-order sequence.

4. The method of claim 3 wherein the set of instructions includes all instructions in the in-order sequence.

5. The method of claim 3 wherein the set of instructions comprises a subset of the in-order sequence.

6. A method of identifying instruction dependencies for an ordered set of instructions comprising the steps of:

(a) setting bit positions for a jth instruction of the sequence in an ith line of a storage structure having i bits, where i and j are integers, the bit positions corresponding to instructions upon which the ith instruction directly depends;

(b) setting additional bit positions in the ith line corresponding to instructions upon which the ith instruction indirectly depends by performing a logical bitwise OR operation of lines in the storage structure corresponding to the instructions upon which the ith instruction directly depends.

7. The method of claim 6 wherein the storage structure has i lines, a kth line having k bit positions where k is an integer ranging from 1 to i.

8. The method of claim 7 wherein the ith line is at the bottom of the storage structure and the jth bit in the ith line corresponds to the (j−1)th instruction.

9. The method of claims 6, 7 or 8 further comprising the steps for a (j+1)th instruction in the sequence of:

shifting each line in the storage structure up by one line, and to the left by one bit position, thereby vacating the ith line;

repeating steps (a) and (b) substituting the (j+1)th instruction for the jth instruction.

\* \* \* \* \*